US010757951B2

(12) United States Patent
Mercuri

(10) Patent No.: US 10,757,951 B2
(45) Date of Patent: *Sep. 1, 2020

(54) OPENWORK FABRIC

(71) Applicant: Merctech Pty Ltd, Holden Hill (AU)

(72) Inventor: Ennio Mercuri, Holden Hill (AU)

(73) Assignee: Merctech Pty Ltd, Holden Hill (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/309,224

(22) PCT Filed: Jun. 14, 2017

(86) PCT No.: PCT/AU2017/000129
§ 371 (c)(1),
(2) Date: Dec. 12, 2018

(87) PCT Pub. No.: WO2017/214658
PCT Pub. Date: Dec. 21, 2017

(65) Prior Publication Data
US 2019/0307137 A1    Oct. 10, 2019

(30) Foreign Application Priority Data

Jun. 14, 2016  (AU) ................................ 2016902311

(51) Int. Cl.
*A22C 13/00* (2006.01)
*D04B 21/12* (2006.01)
(Continued)

(52) U.S. Cl.
CPC .............. *A22C 13/00* (2013.01); *A22C 11/00* (2013.01); *D02G 3/32* (2013.01); *D02G 3/36* (2013.01);
(Continued)

(58) Field of Classification Search
CPC .............. Y10T 428/1324; D02G 3/328; A22C 2013/0056; A22C 13/00; A22C 2013/00;
(Continued)

(56) References Cited

U.S. PATENT DOCUMENTS

| 3,251,201 A | 5/1966 | Newman |
| RE26,496 E | 12/1968 | Krauss et al. |

(Continued)

FOREIGN PATENT DOCUMENTS

| AU | 2014202014 A1 | 10/2015 |
| DE | 29 12 961 A1 | 10/1980 |

(Continued)

OTHER PUBLICATIONS

International Search Report dated Sep. 22, 2017 in corresponding International application No. PCT/AU2017/000129; 4 pages.
How to Macrame a Plant Hanger; [online] URL; https://thisyearsdozen.wordpress.com/2009/05/27/how-to-macrame-a-plant-hanger/#/comment-16462; May 27, 2009; search on Dec. 11, 2018; 16 pages.

*Primary Examiner* — Camie S Thompson
(74) *Attorney, Agent, or Firm* — Maier & Maier, PLLC

(57) ABSTRACT

An improved tubular openwork fabric or net for food products, the openwork fabric including a plurality of filament assemblies. Each filament assembly is formed from one or more filaments and the filament assemblies are knitted as alternating conjoined and intermediate members. Each intermediate member includes a single filament assembly and each conjoined member includes a pair of filament assemblies that are worked together. The openwork fabric further includes an extension limiting member to limit a longitudinal extension of the openwork fabric.

19 Claims, 8 Drawing Sheets

(51) Int. Cl.
    *D02G 3/36*       (2006.01)
    *A22C 11/00*    (2006.01)
    *D02G 3/32*       (2006.01)

(52) U.S. Cl.
    CPC ...... *D04B 21/12* (2013.01); *A22C 2013/0043* (2013.01); *A22C 2013/0056* (2013.01); *D10B 2505/10* (2013.01)

(58) Field of Classification Search
    CPC .... A22C 2013/0003; A22C 2013/0069; A22C 7/0046; A22C 11/003; D04B 21/10; D04B 21/12; B65D 29/04; B65D 76/66; D10B 2505/10; D10B 2401/061
    USPC ........ 442/1; 428/36.1, 34.8; 57/225; 66/193, 66/192, 195; 426/105; 452/32
    See application file for complete search history.

(56) References Cited

U.S. PATENT DOCUMENTS

| | | |
|---|---|---|
| 4,467,595 A | 8/1984 | Kramers |
| 5,868,612 A | 2/1999 | Mercuri |
| 7,687,122 B2 | 3/2010 | Huckfeldt et al. |
| 2003/0054747 A1 | 3/2003 | Hihnala et al. |
| 2015/0289525 A1 | 10/2015 | Mercuri |

FOREIGN PATENT DOCUMENTS

| | | |
|---|---|---|
| DE | 202010008967 U1 | 1/2011 |
| GB | 1 368 927 A | 10/1974 |

OPENWORK FABRIC

CROSS-REFERENCE TO RELATED APPLICATIONS

The present application claims priority from Australian Provisional Patent Application No. 2016902311 titled "AN IMPROVED OPENWORK FABRIC" and filed on 14 Jun. 2016, the content of which is hereby incorporated by reference in its entirety.

FIELD

The present disclosure relates to an improved tubular openwork fabric or net for food products. In a particular form the present disclosure relates to improved use of elastic and non-elastic thread for a tubular net or netting.

BACKGROUND

The present disclosure may find many applications, and these applications may not be limited to the food industry. However, for easy description, the disclosure will be described in relation to its application for use in the food industry. In the following description, the terms "casing", "food product" and "netting" shall have the following meanings:
  a. "casing" any synthetic or natural tubular material, or material of any shape, used to wrap processed food,
  b. "food product" any fresh or processed food products, and in particular fresh or processed meat products, and
  c. "netting" any knitted, woven, extruded or otherwise manufactured packaging netting which is elasticated, rigid, substantially inextensible, laterally extensible and/or longitudinally extensible.

In the manufacture of food products, and in particular in respect of the manufacture of meat products, natural or artificial casings in the form of elongated tubes are normally either pumped full of meat from a machine specifically designed for the purpose, or have portions of meat placed within the tube prior to either a cooking or a curing process taking place. In some cases, machines dealing with whole meat portions, emulsified or minced meat products use a feed mechanism for injecting meat through a delivery tube or injection horn where the casing is shirred onto the external surface of the delivery tube. A clip or other closure means is placed over the end of the casing, and a quantity of meat is then injected into the casing. Depending on the desired length of the meat product, the process is interrupted at various stages so that clips or twists may be applied to form separate and individual meat product portions.

In addition, whole meat portions may be inserted within tubular casing or netting and, in this instance, stuffing tubes or horns are also used which enables the tubular casing to be stretched, whereupon meat portions can be readily introduced within the tubular casing. In some cases, artificial skins such as collagen-based casings, fibrous casings, or knitted tubular casings have a tubular net or netting placed over the outside of the collagen once the food product is located within the casing. Alternatively, the food product may be inserted directly within the netting without the use of any inner casing. In any case where netting is used, the netting may be shirred onto the external surface of the delivery tube and be dispensed as the meat portions are introduced into the netting.

In some instances, the netting is used primarily for decorative effect and remains in place prior to consumption of the food product. However, in addition to providing a decorative effect, the netting, if properly sized, can be used to produce a surface pattern effect. In this instance, the longitudinal and transverse members of the net apply a force to the surface of the meat product and, provided that the surface of the food product is sufficiently resilient, then the netting will protrude into the surface of the food product. This results in a quilt-like surface pattern, where the longitudinal and transverse members press into the surface of the food product so that the food product bulges outwardly within the square, rectangle or other shapes formed by the longitudinal and transverse members.

In addition to the appearance, the netting may be used to apply pressure for binding. This is where meat pieces have been treated to produce a sticky exudate and multiple pieces are placed within the netting which assists in binding the meat pieces together to form a single meat portion. It is also desirable, particularly in relation to the cooking or curing process, to maintain a desirable shape, and to apply constant compressive force to the meat product during the cooking or curing process. The constant pressure ensures that air pockets do not readily form within the meat, as this may lead to spoilage or unsightly appearance once sliced. It is also desirable to ensure that, particularly during a process where the meat product is hung to cure, no elongation or stretching of the meat product occurs. It is desirable therefore, to hold the meat pieces together from two directions i.e. apply pressure both longitudinally and laterally.

In some instances, during a curing process, the weight of the meat product can cause the netting to stretch, thus resulting in a conical or tapered section from the hanging point to the beginning of the meat product. In many instances, depending on the type of the meat product, a small conical section of meat can be formed at the upper end. This particular section tends to be unsightly when the netting is removed, and is normally cut away and wasted. Alternatively, if the ends are used, there is poor sliceability due to variation in shape.

This problem results from the fact that elastic netting is normally non-elastic (or inextensible) in the longitudinal direction. Only the circumferential members, which form a continuous spiral, are normally formed from elastic material. The longitudinal members are formed from conventional chain stitching. Apart from the normal stretch which results from the knitting process, the netting is generally inextensible in the longitudinal direction. Accordingly, as there is no longitudinal elasticity, stretching and thinning at the upper end of the netting will occur during the curing process.

Further, as the continuous spiral is a single strand, or in some cases multiple strands, of elastic thread, the overall extensibility of the net is limited. Accordingly, the net will be made for a target size that provides a suitable compressive force to a meat product of the target size. However, for meat products that are smaller, the net will be baggy and not provide a suitable indentation on the surface of the meat product. For meat products that are larger, the net may not fit around the meat product. Further, even if the net does fit over the meat product, most meat products taper at one or both ends which means the net will be baggy and not provide suitable indentation at the tapered portion. Finally, as only the circumferential members are formed from elastic material, the compressive forces applied to the meat product produce a mild and superficial imprint upon the surface of the meat product.

To address these problems, the applicant developed a fully elastic netting as described in AU 2014202014 titled "An Openwork Fabric" in which the netting was elastically extensible in both the longitudinal and transverse directions to provide improved indentation upon the surface of the meat product (as the elastic threads impart a deep indentation in the meat surface).

Whilst the fully elastic netting can provide deep indentation the presence of longitudinal elastic threads can present problems when dispensing the netting. Initially, the netting is dispensed freely from the delivery tube. However, as the netting is dispensed over a growing length of the delivery tube, a longitudinal tension is applied to the netting. Due to the extensibility of the longitudinal components, this increase in longitudinal tension can stretch the dispensed netting and alter the shape of the meat product within the netting. The tension applied when the net is pulled from the end of the filling tube can be low tension which produces a longer torpedo shape, through to high tension which causes a more spherical shape. This variation in shape between torpedo shapes and spherical shapes is undesirable.

There is thus a need to provide an improved openwork fabric, or at least provide a useful alternative to previous openwork fabrics.

SUMMARY

According to a first aspect, there is provided an openwork fabric comprising a plurality of filament assemblies wherein each filament assembly is formed from one or more filaments and the plurality of filament assemblies are knitted as alternating conjoined and intermediate members. Each intermediate member comprises a single filament assembly and each conjoined member comprises a pair of filament assemblies that are worked together. The openwork fabric further comprises an extension limiting means to limit a longitudinal extension of the openwork fabric.

In one form, the extension limiting means comprises a plurality of a first set of filament assemblies having a first extensibility, and a plurality of a second set of filament assemblies having a second extensibility less than the first extensibility.

In a further form, the first set of filament assemblies are extensible filament assemblies and the second set of filament assemblies are substantially inextensible filament assemblies. In a further form, the ratio of extensible filament assemblies to inextensible filament assemblies is between 40:1 and 1:40. In a further form, the ratio of extensible filament assemblies to inextensible filament assemblies is a regular pattern with a ratio between 1:1 and 1:4.

In one form, each filament assembly in the first set of filament assemblies is comprised of a composite filament. In a further form, each composite filament comprises an inner layer and an outer layer, the inner layer being extensible and the outer layer comprising at least one spiral winding of an inextensible thread. In a further form, each composite filament comprises an inner layer and an outer layer, the inner layer being extensible and the outer layer comprising two or more threads braided together. In a further form, the each filament assembly in the second set of filament assemblies is comprised of a second composite filament, wherein each second composite filament comprises an inner layer and an outer layer, the inner layer being extensible and the outer layer comprising two or more threads braided together. In a further form, the inner extensible layer comprises natural rubber, synthetic rubber or elastane.

In one form, the at least one filament assembly is extensible and at least one of the one or more filaments comprises elastic thread, and the longitudinal extension of the at least one extensible filament assembly is limited by the extension limiting means.

In one form, the extension limiting means comprises any one or more selected from the group consisting of a portion of at least one extensible filament, at least one substantially inextensible filament, at least one filament assembly and at least one portion of the openwork fabric.

In one form, each filament assembly transitions from an intermediate member in a first direction into a conjoined member and then transitions into a subsequent intermediate member in a second direction, such that each filament assembly extends substantially longitudinally along the net as the filament transitions through alternating conjoined and intermediate members.

In one form, each conjoined member comprises a pair of adjacent filament assemblies that transition from adjacent first and second intermediate members by joining to form a first end of a conjoined member and separate at a second end of the conjoined member to form adjacent third and fourth intermediate members.

In one form, each intermediate member comprises a chain stitch to form a filament assembly.

In one form, each conjoined member comprises a chain stitch of a pair of filament assemblies.

In one form, each conjoined member comprises two chain stitches of filament assemblies that are joined together.

In one form, at least one filament assembly is extensible and at least one of the one or more filaments comprise elastic thread.

In one form, longitudinal extension of the at least one extensible filament assembly is limited by the extension limiting means.

In one form, the extension limiting means comprises any one or more selected from the group consisting of a portion of at least one extensible filament, at least one substantially inextensible filament, at least one filament assembly and at least one portion of the openwork fabric.

In one form, the openwork fabric is tubular.

In one form, the openwork fabric is a tubular net.

In one form, the at least one extensible filament assembly comprises natural rubber, synthetic rubber or elastane with no outer layer of inextensible thread.

According to a second aspect, there is provided a food product wrapped in the openwork fabric as described above.

A result of the openwork fabric being extensible in both longitudinal and transverse directions is that the fabric will provide variation in the shape and size of the hexagon pattern imparted upon the surface of a meat product, in response to meat products with a differing diameter i.e., at the centre of the meat product where the diameter is the largest the hexagons are stretched more and therefore are larger in size. Accordingly, the net provides variable indentations when stretched to different extents. Further, the extensible nature of the openwork fabric provides indentation on the surface of meat products of both small and large diameter. However, longitudinal extension of the openwork fabric is limited by the extension limiting means. This means that when the openwork fabric is pulled from the loading tube, the openwork fabric is initially dispensed under low tension but as openwork fabric is pulled over a lengthening section of dispensing tube the tension increases and the openwork fabric is stretched longitudinally until the extension limiting means limits further extension. The extension limiting means thereby acts as a governing element that determines the amount of openwork fabric applied to each meat portion, which is desirably roughly the same length of openwork fabric per meat portion across the entire length of the openwork fabric coming from the filling tube. The result is more meat portions with a longer torpedo shape and fewer meat portions with a more spherical shape, as well as greater control and consistency of the shape of the meat products.

BRIEF DESCRIPTION OF DRAWINGS

Embodiments of the present disclosure will be discussed with reference to the accompanying drawings wherein.

In the following description, like reference characters designate like or corresponding parts throughout the figures.

DETAILED DESCRIPTION

Figure 1:
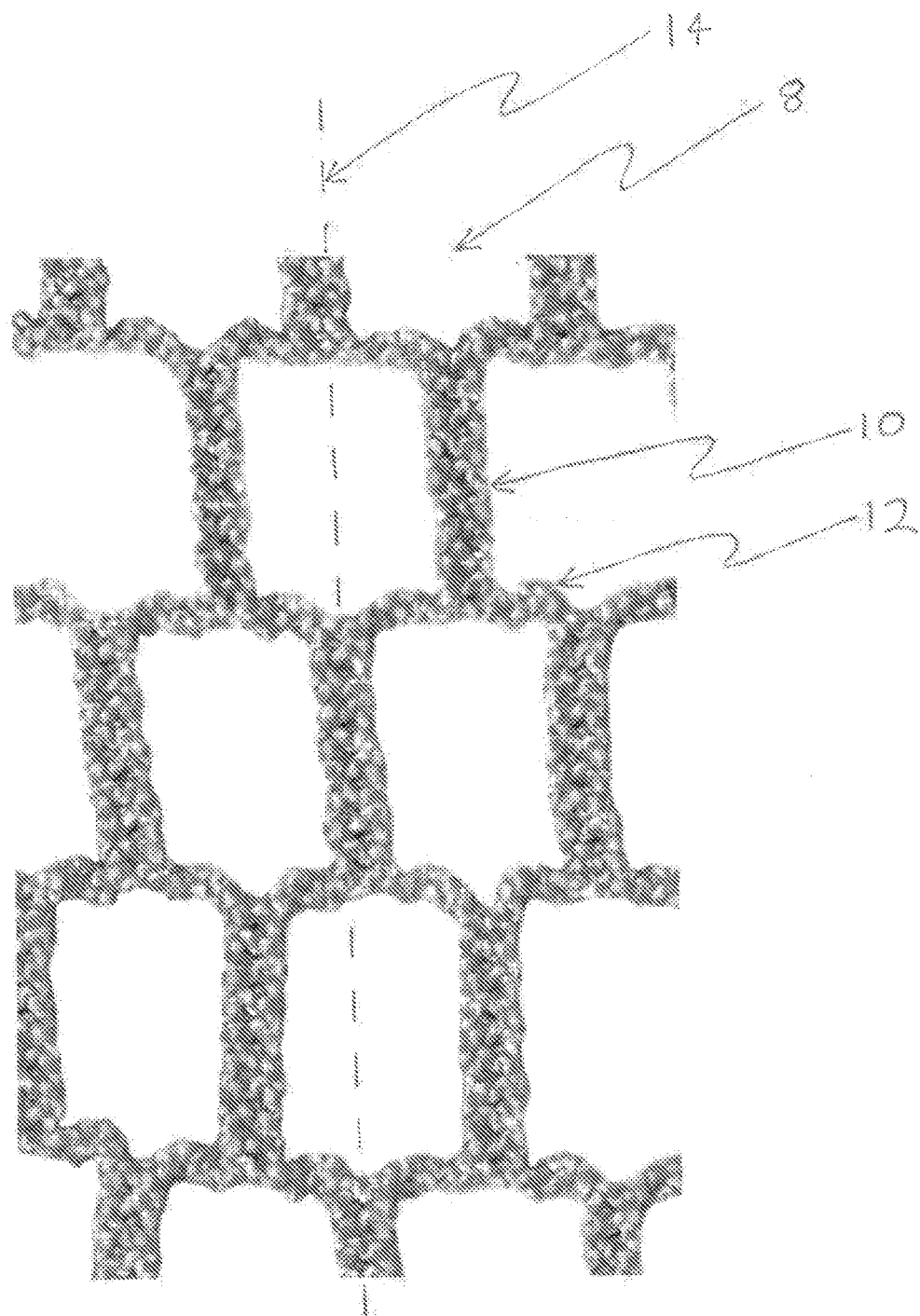
FIG. 1 is a view of the openwork fabric without tension being applied.

Referring now to FIG. 1, there is shown an openwork fabric or net 8 having conjoined members 10 and intermediate members 12 and constructed from thread or filament assemblies. The conjoined members 10 have a finite length and are staggered relative to adjacent conjoined members. The staggered and adjacent conjoined members 10 are aligned in a longitudinal direction and are joined by intermediate members 12 that diverge left and right from the end of each conjoined member 10 to transition into the next two adjacent and staggered conjoined members.

The adjacent conjoined members 10 have intermediate members 12 at each end and form rows that extend laterally across the openwork fabric. The conjoined members 10 in any given row are staggered laterally relative to the conjoined members in any immediately adjacent row. The conjoined members 10 in every second row are substantially aligned longitudinally.

Figure 2:
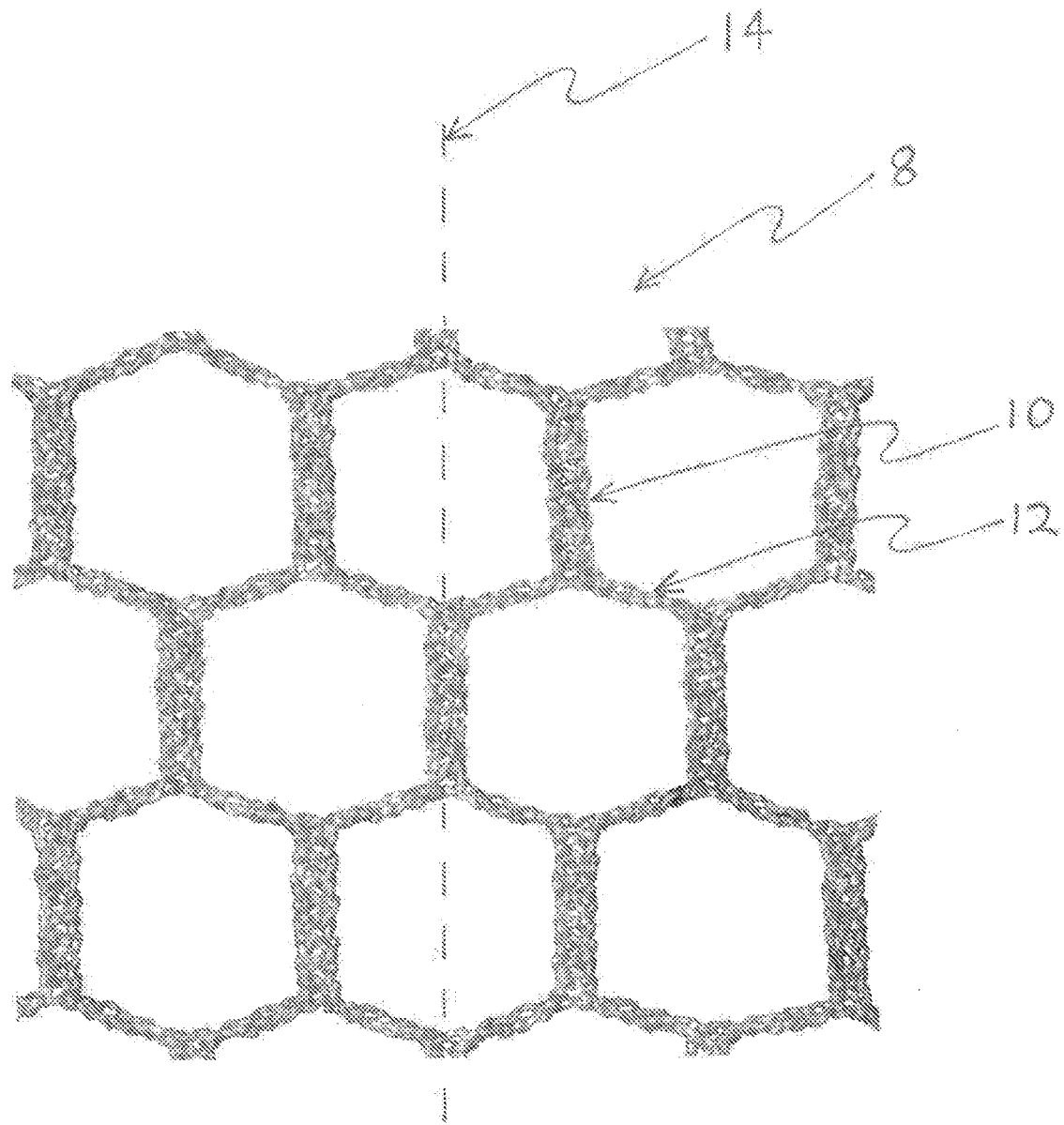
FIG. 2 is a view of the openwork fabric with tension being applied.

When tension is applied to the net, the extensible nature of the net provides stretch both longitudinally and laterally. When stretched, the resultant angles will change between adjacent conjoined members 10 and intermediate members 12 of the openwork fabric or net 8. Also, the shapes will change between said conjoined and intermediate members. This difference can be seen when comparing FIG. 1 and FIG. 2. FIG. 1 shows the net in substantially relaxed state, where the conjoined members 10 are aligned substantially longitudinally relative to the longitudinal axis 14 of the net 8 and the intermediate members 12 are aligned substantially laterally. FIG. 2 shows the net in a state where tension has been applied to the net both longitudinally and laterally, such that the apertures provided between adjacent and connected conjoined and intermediate members form hexagonal shapes. The conjoined members 10 are aligned substantially longitudinally and the intermediate members 12 are at an angle between substantially traverse and longitudinal, relative to the longitudinal axis 14 of the net 8.

Figure 3:
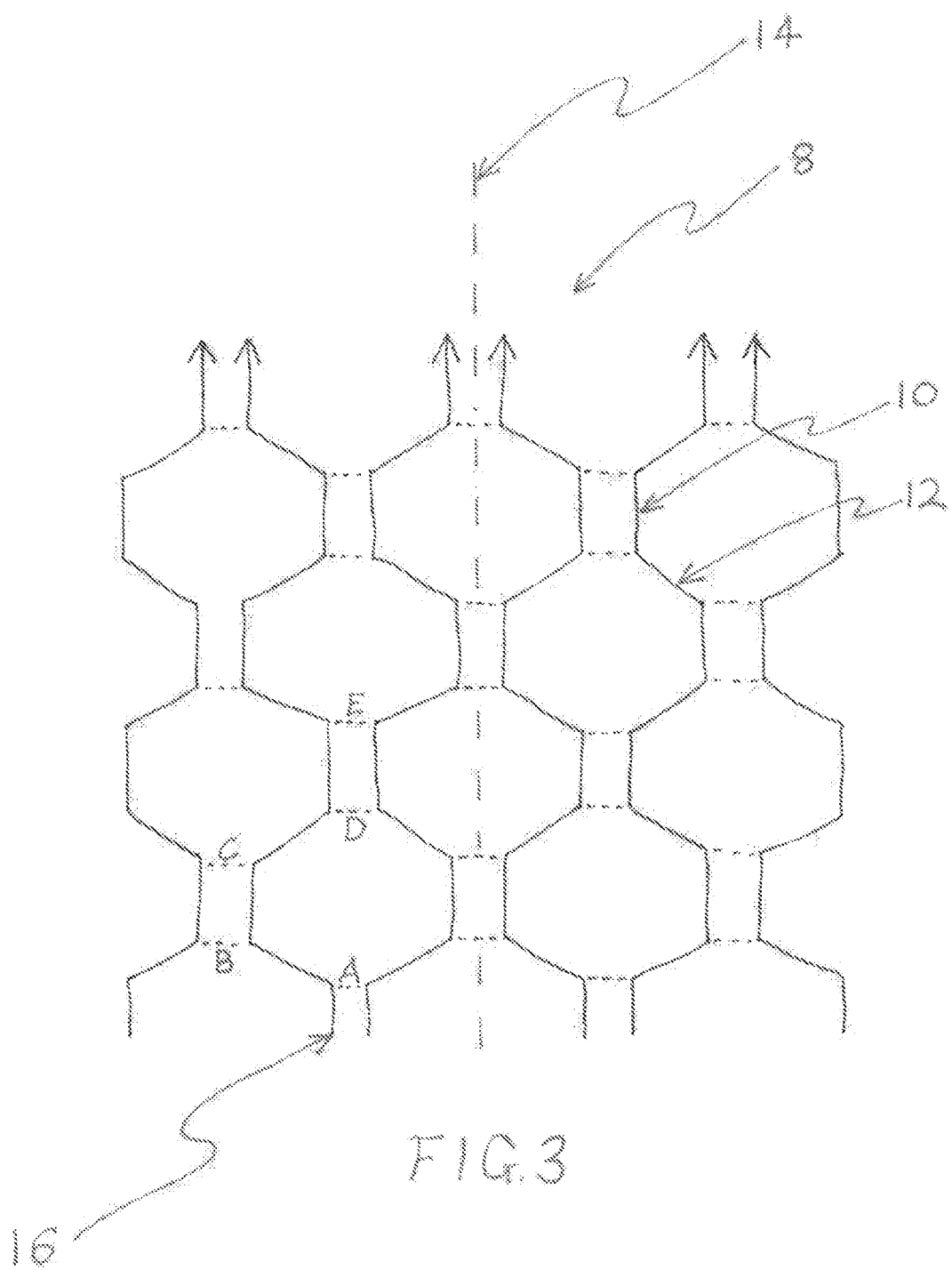
FIG. 3 is a view showing the path of each filament assembly along the openwork fabric.

For ease of reference, FIG. 3 shows schematically a path of each filament assembly 16 along the net 8. Each filament assembly 16 is aligned substantially longitudinally along the net as the filament assembly transitions through intermediate members 12 and conjoined members 10. An example will now be shown of the path of a filament assembly along the net. Starting from A, filament assembly 16 transitions through a first intermediate member in a first direction to B, through a first conjoined member to C before transitioning into a second intermediate member in a second direction to D and then through a second conjoined member to E. The sequence of transitions through the intermediate and conjoined members is repeated for each filament assembly along the length of the net.

The paths of adjacent filament assemblies will now be described. Two filament assemblies diverge from a conjoined member at A into adjacent and separating intermediate members. A first filament assembly transitions from A to B as an intermediate member and converges with an adjacent intermediate member at B to form a conjoined member from B to C. The filament assemblies in the conjoined member at C then diverge where the first filament assembly transitions from C to D as an intermediate member and then converges with an adjacent intermediate member at D. The filament assemblies that separated at A are the same filament assemblies that converge at D. The filament assemblies then form a conjoined member from D to E. A further explanation is that each conjoined member comprises a pair of adjacent filament assemblies that transition from adjacent first and second intermediate members into a first end of a conjoined member and then separate at a second end of the conjoined member to form adjacent third and fourth transverse sections. The sequence of transitions through the transverse and conjoined members is repeated for each filament assembly along the length of the net.

A filament assembly may be extensible or substantially inextensible. In embodiments, the net 8 comprises extensible and substantially inextensible filament assemblies. In embodiments, each extensible filament assembly comprises at least one filament or composite filament. In embodiments, at least one extensible filament assembly comprises at least one extensible filament and at least one substantially inextensible filament. In embodiments, each substantially inextensible filament comprises at least one filament or composite filament. In some embodiments the filament assemblies may have a range of extensibilities e.g. a first set with a first extensibility, and a second set with a second extensibility less than the first extensibility.

Each intermediate member 12 is a filament assembly. Each intermediate member may be a chain stitch of at least one filament or composite filament. In an alternative, each intermediate member may be at least one type of suitable stitch.

Each conjoined member 10 comprises two filament assemblies worked together and accordingly may comprise two or more filaments or composite filaments. Two adjacent filament assemblies are worked together to form each conjoined member 10. In an embodiment, each conjoined member 10 may be a chain stitch of two filament assemblies i.e. two filament assemblies that are paired and then worked into a series of chain stitches. In an alternative, each conjoined member 10 may be two chain stitches of filament assemblies that are joined or worked together i.e. two series of chain stitches that are joined or worked together. In another alternative, each conjoined member 10 may be any suitable number of chain stitches of two filament assemblies. In another alternative, each conjoined member 10 comprises at least one type of suitable stitch.

Figure 4A:
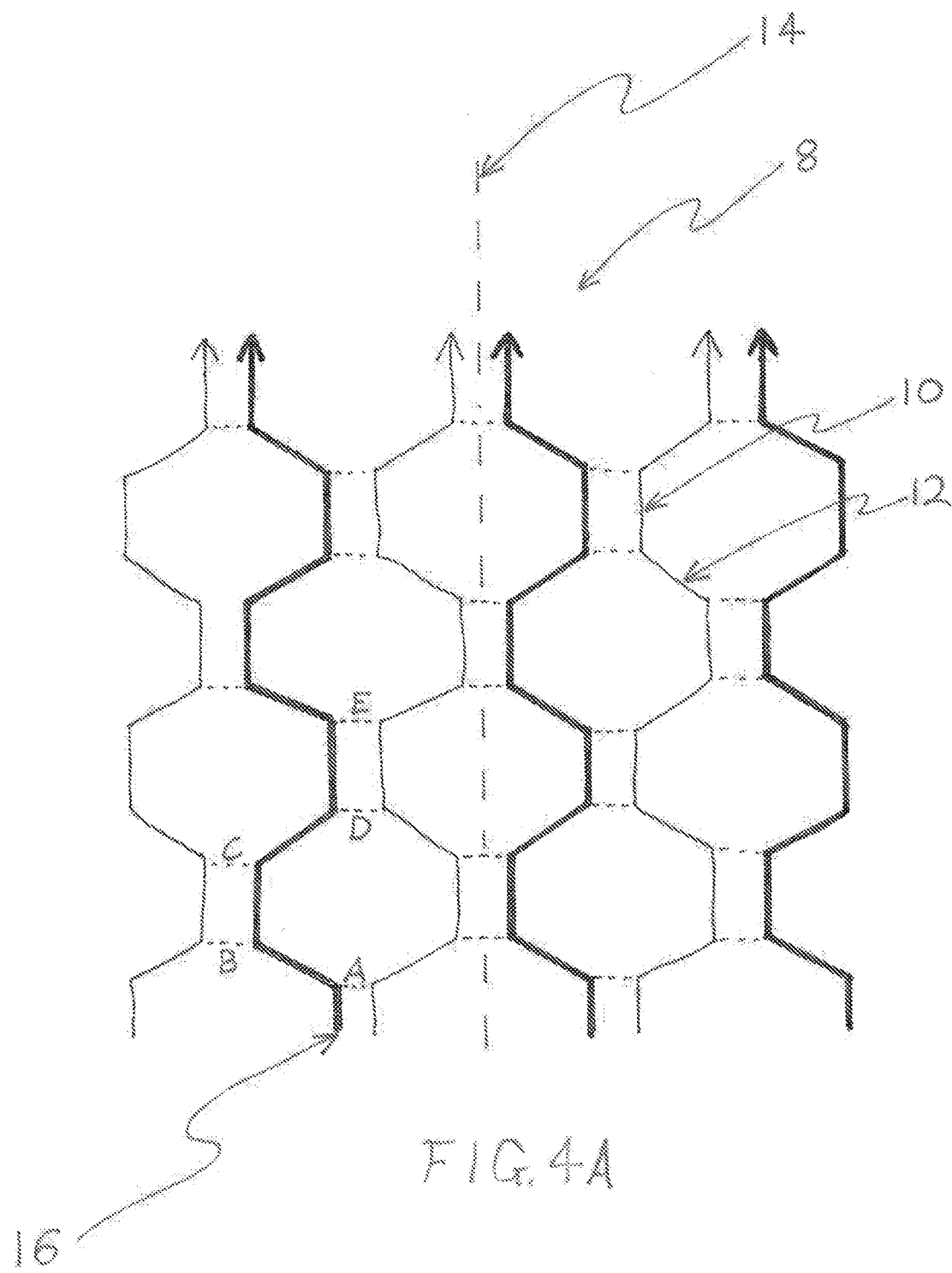
FIG. 4A is a view of the path of each extensible filament assembly along the openwork fabric according to an embodiment where the extensible and substantially inextensible filament assemblies are in a ratio of 1:1.

Referring now to FIGS. 4A, 4B, 4C and 4D there are embodiments showing schematically the path of each extensible filament assembly where there are variable numbers of extensible and substantially inextensible assemblies. The extensible filament assemblies are illustrated as thick lines and the substantially inextensible filaments are illustrated as thin lines. FIG. 4A shows an embodiment where the extensible and substantially inextensible filament assemblies are in a ratio of 1:1. In the illustrated embodiment, the extensible and substantially inextensible filament assemblies are in repeating pattern of one extensible filament assembly followed by one substantially inextensible filament assembly (i.e. alternating extensible and substantially inextensible filament assemblies).

Figure 4B:
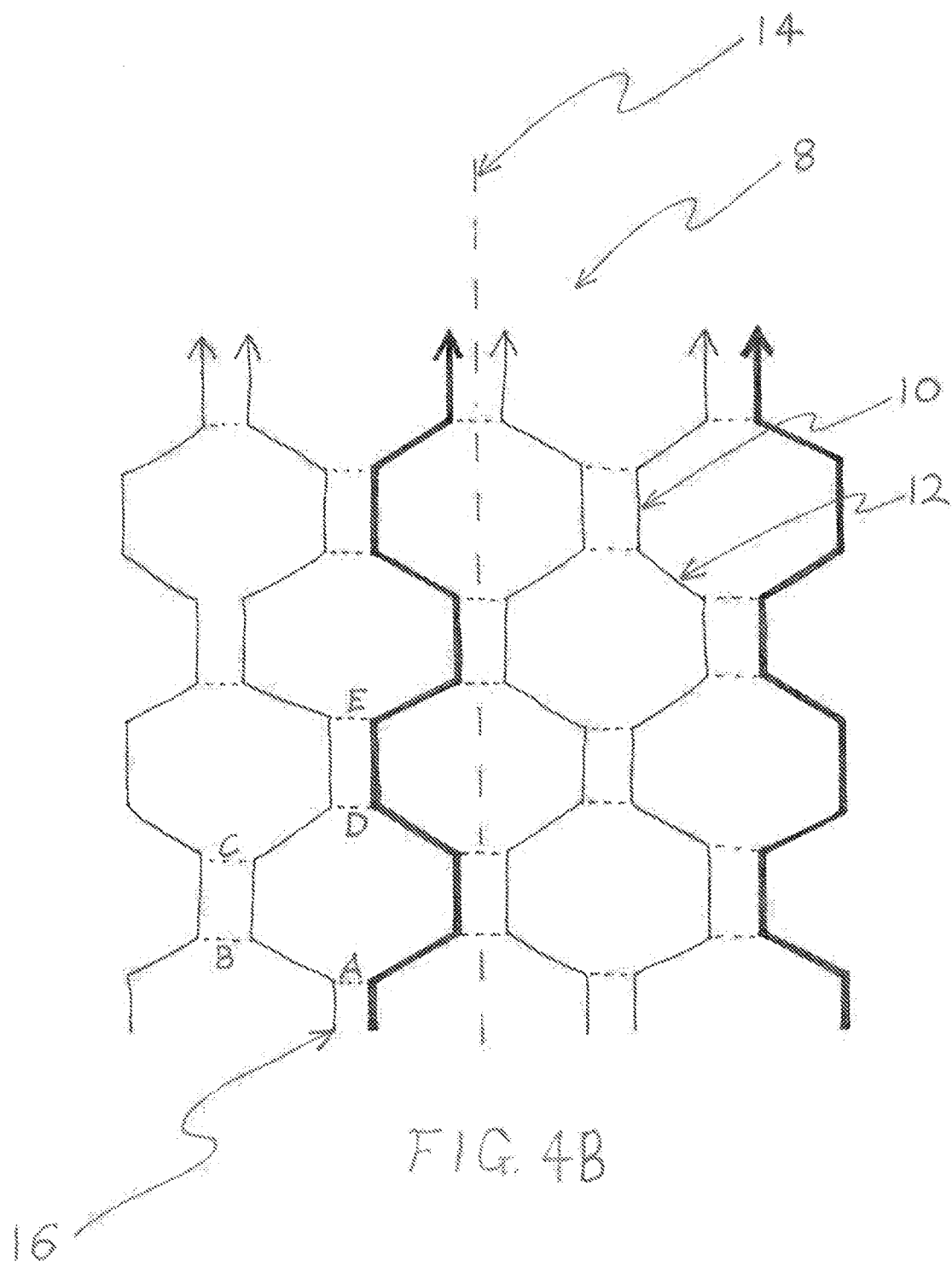
FIG. 4B is a view of the path of each extensible filament assembly along the openwork fabric according to an embodiment where the extensible and substantially inextensible filament assemblies are in a ratio of 1:2.

FIG. 4B shows an embodiment where the extensible and substantially inextensible filament assemblies are in a ratio of 1:2. In the illustrated embodiment, the extensible and substantially inextensible filament assemblies are in repeating pattern of one extensible filament assembly followed by two substantially inextensible filament assemblies, and then the pattern repeats.

Figure 4C:
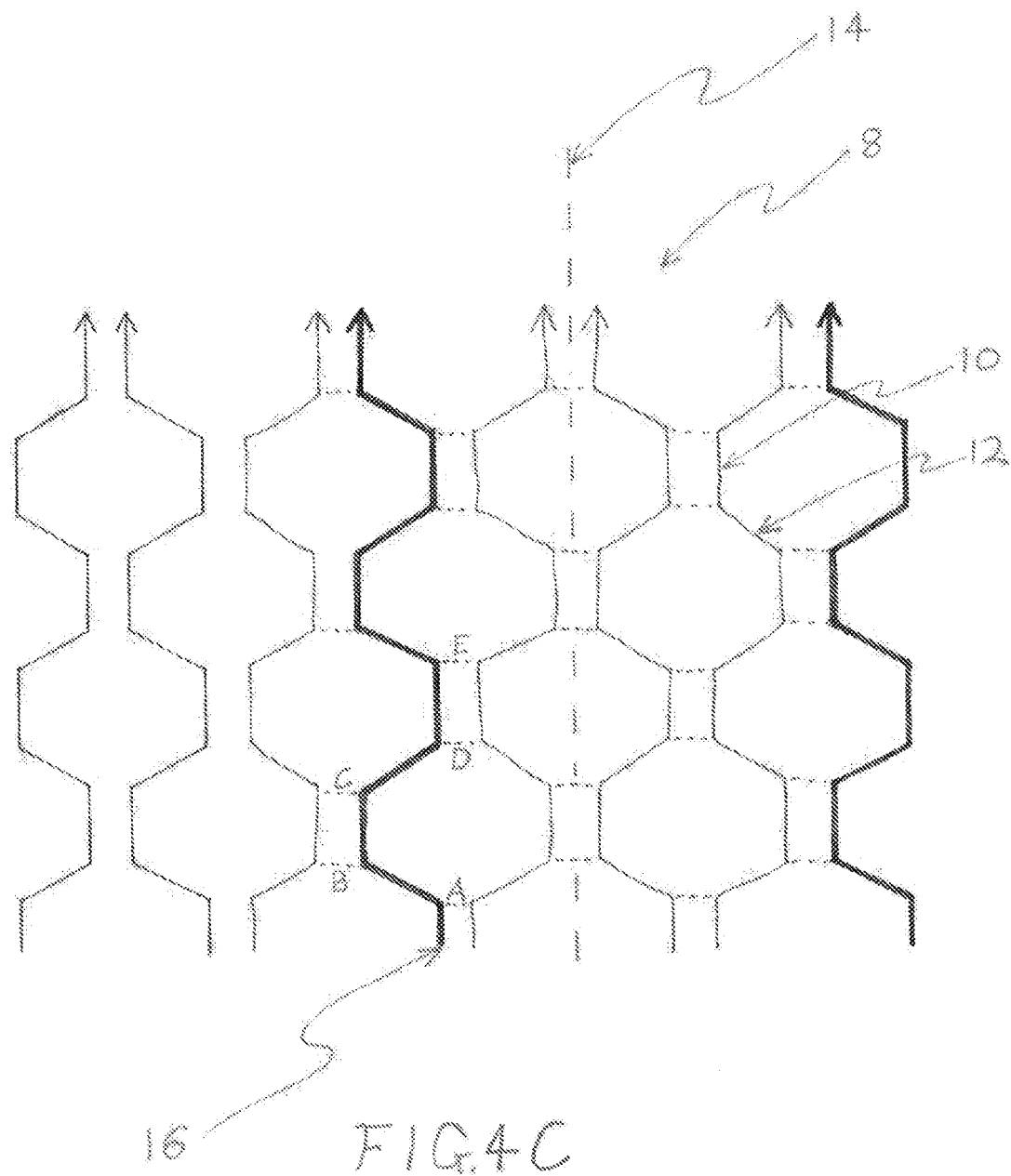
FIG. 4C is a view of the path of each extensible filament assembly along the openwork fabric according to an embodiment where the extensible and substantially inextensible filament assemblies are in a ratio of 1:3.

FIG. 4C shows an embodiment where the extensible and substantially inextensible filament assemblies are in a ratio of 1:3. In the illustrated embodiment, the extensible and substantially inextensible filament assemblies are in repeating pattern of one extensible filament assembly followed by three substantially inextensible filament assemblies, and then the pattern repeats.

Figure 4D:
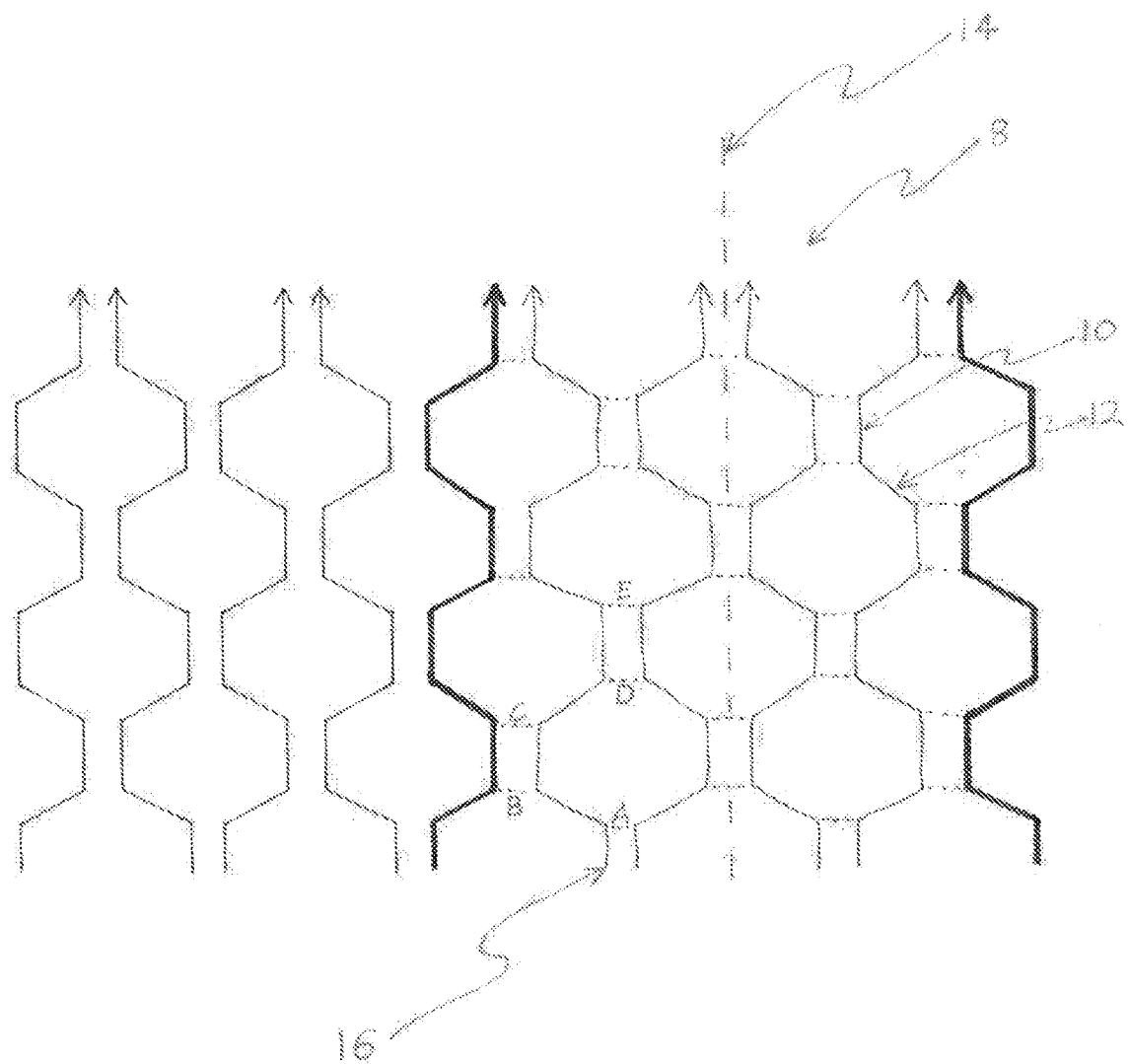
FIG. 4D is a view of the path of each extensible filament assembly along the openwork fabric according to an embodiment where the extensible and substantially inextensible filament assemblies are in a ratio of 1:4.

FIG. 4D shows an embodiment where the extensible and substantially inextensible filament assemblies are in a ratio of 1:4. In the illustrated embodiment, the extensible and substantially inextensible filament assemblies are in repeating pattern of one extensible filament assembly followed by four substantially inextensible filament assemblies, and then the pattern repeats.

In embodiments, the extensible and substantially inextensible filament assemblies are in a ratio of between 40:1 and 1:40. In embodiments, the extensible and substantially inextensible filament assemblies are in a ratio of 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20 or any ratio between 20:1 and 1:20. In embodiments, the extensible and substantially inextensible filament assemblies are in any suitable pattern that provides any one of the above ratios (i.e. from 40:1 to 1:40). Accordingly, a ratio of 1:3 of extensible to substantially inextensible filament assemblies could be in a pattern where 1 extensible filament assembly is separated by 3 substantially inextensible filament assemblies, in a pattern where 2 extensible filament assemblies are separated by 6 substantially inextensible filament assemblies, or any other suitable pattern. The ratio may be achieved using a regular pattern (ie the two previous patterns), or an irregular arrangement or varying patterns such as 1:4 in some regions and 40:1 in other regions.

The openwork fabric or net 8 may comprise any suitable number of filament assemblies that transition through the transverse and conjoined members along the length of the net. In embodiments, the net 8 comprises between 1 and 1000 filament assemblies or greater than 1000 filament assemblies. In an embodiment, the net 8 comprises 36 filament assemblies and has a ratio of 1:3 extensible to substantially inextensible filament assemblies (i.e. 9 extensible filament assemblies and 27 substantially inextensible filament assemblies). It is within the scope of the disclosure that the number of filament assemblies may be varied to provide different sized nets for different applications. Similarly, the ratio of extensible to substantially inextensible filament assemblies may be varied depending upon either one or both of the desired extensibility of the net and the desired pressure on the meat product. A higher ratio of extensible to substantially inextensible filament assemblies (eg due to a greater number of extensible filaments) results in greater pressure being applied to the meat product within the net.

Figures 5, 6:
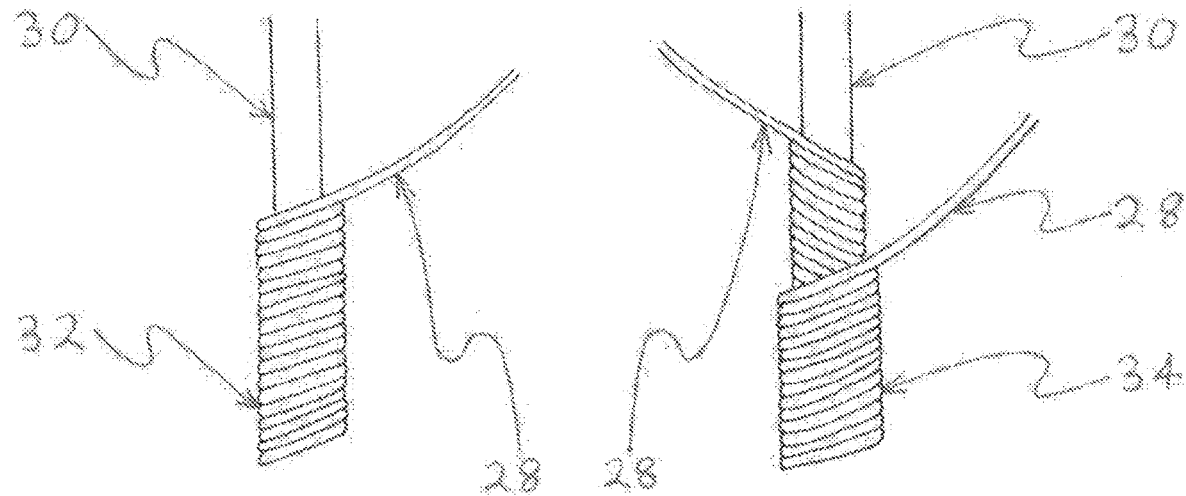
FIG. 5 is an embodiment of a filament comprising at least one elastic strand covered by a single substantially inextensible thread wrapped in a single direction.
FIG. 6 is another embodiment of a filament comprising at least one elastic strand covered by two substantially inextensible threads wrapped in opposite directions.
Figure 7:
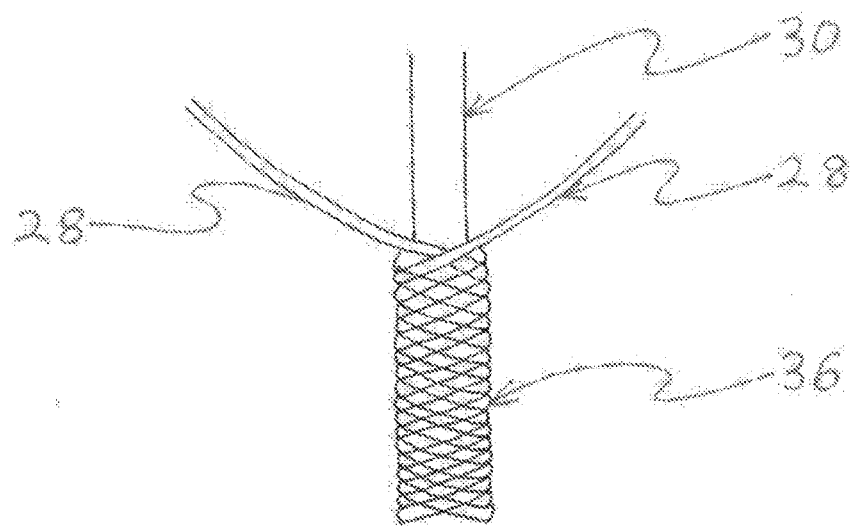
FIG. 7 is another embodiment of a filament comprising at least one elastic strand covered by two or more substantially inextensible threads that are braided or otherwise interwoven around the at least one elastic strand.

Referring now to FIGS. 5 to 7, there are shown embodiments of an extensible filament or yarn of the present disclosure. Each extensible filament or yarn is made from at least one elastic strand 30. In the illustrated embodiments, the at least one elastic strand is covered by at least one substantially inextensible thread 28. FIG. 5 shows an embodiment of an extensible filament comprising at least one elastic strand 30 covered by a single substantially inextensible thread 28 wrapped in a single direction i.e. as a spiral winding 32. FIG. 6 shows an embodiment of an extensible filament comprising at least one elastic strand 30 covered by two substantially inextensible threads wrapped in opposite directions 34. FIG. 7 shows an embodiment of an extensible filament comprising at least one elastic strand 30 covered by two or more substantially inextensible threads that are braided or otherwise interwoven around the at least one elastic strand in at least one direction 36. In other embodiments, an extensible filament or yarn is made from at least one elastic strand and is covered by three substantially inextensible threads. In other embodiments, an extensible filament or yarn is made from at least one elastic strand and is covered by one of multiple substantially inextensible threads. In an embodiment, two or more elastic strands are present in each extensible filament or yarn, and both (or all) the elastic strands are covered by the same one or more inextensible threads. In an alternative, each extensible filament is of any suitable construction that provides extensibility to the resultant filament i.e. any elasticated yarn with any combination could be used e.g. no covering (ie elastic only), single, double, triple or air covered. Accordingly, the extensible filament may be of a non-composite or composite construction suitable for the present openwork fabric. The elastic material in the extensible filament or yarn may be rubber, synthetic rubber, elastane or any suitable extensible material. The inextensible thread covering may be made from natural fibres including cotton, bamboo, hemp and wool fibres or from synthetic fibres including polyester, nylon and rayon. That is, the yarn or extensible filament may be considered a covered elastic yarn (ie covered rubber yarn)

in which the inner elastic core may be one or more elastic filaments all of which are covered by one or more inextensible filaments.

In embodiments the covered elastic or rubber used in each extensible filament is low stretch in order to behave more like a rigid polyester yarn. However, when multiple elastic yarns are combined as a netting, the resultant netting has sufficient stretch to apply pressure onto the meat. A non-covered elastic or rubber will normally over stretch and is difficult to knit successfully to create a suitable meat netting product. The covering also protects the raw rubber from heat damage during cooking. The covering also protects the meat from the odour of bare rubber that can occur when the meat is being cooked.

A substantially inextensible filament or yarn of the present disclosure may have a similar structure to the extensible yarn depicted in FIGS. 5 to 7, but may be made from components that provide a substantially inextensible filament. In certain embodiments, the substantially inextensible filament or yarn is of composite construction. In other embodiments, the substantially inextensible filament or yarn is of non-composite construction. In certain embodiments, the inextensible yarn is interlocked, spun, braided, knitted, extruded, drawn or made by any other process known in the art. The inextensible yarn may be made from natural fibres including cotton, bamboo, hemp and wool fibres or any other suitable natural fibre, or from synthetic fibres including polyester, nylon and rayon or any other suitable synthetic fibre.

In embodiments, the extension limiting means may take different forms and may be achieved by various means. In embodiments, the extension limiting means is designed to limit extension of the openwork fabric. The extension limiting means limits extension of the openwork fabric by limiting extension of any one or more of the filament, filament assembly and openwork fabric. As used herein "any one or more of" means at least one selected from the list of integers following "any one or more of", and does not mean at least one selected from each of the members of the list of integers. In embodiments, the extension limiting means is designed to limit elastic extension of any one or more of the filament, filament assembly and openwork fabric. Accordingly, any one or more of the filament, filament assembly and openwork fabric may extend up to a point and then the extension limiting means will limit further extension. In embodiments, the extension limiting means limits longitudinal extension of any one or more of the filament, filament assembly and openwork fabric.

In some embodiments, and as outlined above, the extension limiting means may be provided by using two sets of filament assemblies with different extensibilities (or elasticities). The first set of filament assemblies are comprised of extensible filaments, whilst the second set of filament assemblies are comprised of inextensible filaments (ie the second set are less extensible or less elastic than the first set). As outlined above, the ratio of the extensible to inextensible filaments assemblies may range from 40:1 to 1:40. In one embodiment the ratio is in the range 1:1, 1:2, 1:3, 1:4. Further the ratio need not be regular. In each case the filament assemblies may be comprised of a single filament, or multiple filaments of the same type or elasticity (or inelasticity).

In some embodiments the extension limiting means is variation in the extensibility (or elasticity) of the composite filaments used to knit the filament assemblies. In this embodiment the openwork fabric comprises at least two sets of filament assemblies where the first set of filament assemblies comprised of a first set of composite filaments with a first extensibility (or elasticity) and a second set of filament assemblies comprised of a second set of composite filaments with reduced extensibility (or elasticity) compared to the first set. For example the first set of composite filaments may be as shown in FIG. 5 and comprised of an elastic strand covered by a single substantially inextensible thread. The second set of filaments may be as shown in FIG. 6 or 7 comprised of an elastic strand covered by two or three substantially inextensible threads, which results in the second set of filaments having less elasticity and extensibility than the first set of filaments.

In some embodiments, the extension limiting means is a portion of at least one extensible filament, such as the substantially inextensible thread or yarn such as cotton or any other fibre wrapped around each extensible filament. As tension is applied to the extensible filament, the extensible filament extends until the inextensible yarn becomes taut and prevents further extension.

In some embodiments, the extension limiting means consists of at least one substantially inextensible filament that is knitted, woven or similar in a relaxed state and becomes taut when tension is applied and prevents further extension.

In embodiments, the extension limiting means consists of at least one inextensible filament that is knitted, woven or similar, that is adjacent to or near to at least one extensible filament. As tension is applied to the extensible filament, the extensible filament extends until slack in the knitted inextensible filament is taken up and the inextensible filament becomes taut and prevents further extension of the extensible filament. Accordingly, the at least one substantially inextensible filament may be combined with the at least one extensible filament to provide a filament assembly. The filament assembly is extensible and has an extension limiting means.

In some embodiments, the extension limiting means is at least one substantially inextensible portion of the openwork fabric. As tension is applied to the openwork fabric, at least one extensible portion of the openwork fabric extends until the inextensible portion becomes taut and prevents further extension of the extensible portion. In embodiments, the openwork fabric may have extensible and inextensible portions, provided by extensible and inextensible filaments, respectively. The extension limiting means thereby prevents any one or more of the extensible filament, filament assembly and extensible portion of the openwork fabric from reaching their respective limits of extension (i.e. the point of failure).

The knitting process is well known for rigid yarns such as polyester and nylon. This disclosure uses an elastic, stretchable yarn in combination with substantially inextensible or rigid yarn to create similar shaped products that impart a pull in fabric that imparts a deep indentation onto the meat surface and along the full length of the meat product.

The knitting machine is an established braiding machine that uses circular warp knitting. The yarns are held with a set (i.e. 2) of counter rotating rings above a ring of latch-hook needles. The latch hook needle comprises a stem ending in a hook with a pivotable latch mounted to the stem. When the latch is in an open or lower position the hook is exposed allowing the needle to catch a yarn, and in a closed or upper position the latch pivots up to engage the end of the hook to form a closed needle and trap a hooked yarn. In the stitching process, the end of the chain of stitches is a loop which is hooked and trapped by the latch in the closed position. As the needle is moved upwards, downward tension on the chain of stitches keeps the loop in a fixed or low position so that it will engage with and force the latch into the open position (ie forces a pivoting action of the latch). As the needle continues to move upward the loop passes over the latch and so it is located below the open latch and around the stem. An incoming yarn is either already in a position, or is moved into a position so that the open hook can hook onto the incoming yarn as the needle moves back down again from its uppermost position. As the needle continues to move downwards, the loop moves up the stem (or rather the stem moves with respect to the loop) so that it engages the bottom of the latch to force it to the closed position, and proceeds to move over the outside of the latch and then over the top of the hook and trapped yarn (ie over the needle—this process is known as knockover) to form a further stitch. Rotation of the rings is used to move the yarns from one needle position to another, and by controlling and coordinating vertical movement of the latch hook needles with the rotation of the rings, a range of stitches and shapes can be generated. For each desired shape a predetermined pattern of movements is used. For example, one side of the hexagonal shape shown in FIG. 2 can be generated by knitting a chain of stiches with a first yarn to make an intermediate member 12. Appropriate rotation of the rings brings the first yarn adjacent to a second yarn, allowing a chain of conjoined stitches to be knitted to make a conjoined member 10. The reverse rotation of the rings separates the first yarn and the second yarn, allowing a further intermediate member 12 to be generated by knitting a chain of stiches using the first yarn. Various sized hexagon shapes are possible by varying the number of individual chain stitches per circular rotation movement. Similarly, the braiding machine can be used to produce openwork fabric having diamond shapes, square shapes or other shapes by varying or controlling the needle movements, type of stitch and number of yarns knitted. Various sized diamond shapes, square shapes or other shapes are possible by varying the number of stitches per circular movement/rotation movement. The difficulty in producing this product is the management of the elastic yarn and the even and balanced supply rate of the elastic yarn into the knitting head.

This product can also have variable size hexagons, diamonds, squares or any other shapes, as required, within the same manufacturing patterning. This means that the meat product can have a number of different shapes of differing sizes on the surface of the one meat product. This is achieved by a particular programming of the machines to enable the software to create these varied patterns.

In the normal use of the present net or openwork fabric, the net is stretched or expanded over the particular product upon which it is used and it remains in such expanded condition during such use. In such expanded condition, and while the net is being placed over the product, it is subjected to longitudinal (i.e. lengthwise) and to transverse stretching thereof. The combination of an extensible composite thread and the stitching method provides a net with both a two-way (i.e. longitudinal and lateral) stretch and higher yield strength than the use of straight lengths of extensible composite thread. The advantage of this combination is that the net provides heavy indentation on the particular product retained within the net.

Further, as the stretch of the present net or openwork fabric is limited by the extension limiting means, this may provide more even resistance to withdrawal or dispensing of the openwork fabric from the delivery tube over the full length of the openwork fabric. In use, the net or openwork fabric is shirred onto the external surface of the elongate delivery tube and is dispensed as the whole meat portions, emulsified or minced meat products are introduced into the openwork fabric. Initially, the openwork fabric is dispensed freely from the delivery tube. However, as the openwork fabric is dispensed over a growing length of the delivery tube, a longitudinal tension or load is applied to the openwork fabric. This variable tension can impact on the overall shape of the meat product. The tension applied when the net is pulled from the end of the filling tube can be low tension which produces a longer torpedo shape, through to high tension which causes a more spherical shape. This variation in shape is undesirable. The extension limiting means provides a limit to the longitudinal extension of the openwork fabric. Accordingly, in embodiments, any one or more of the filament, filament assembly and portion of the openwork fabric will elastically take the load to a point and then any one or more of an inextensible filament, filament assembly and portion of the openwork fabric will take the load. The combination of any one or more of the filament, filament assembly and portion of the openwork fabric, together with any one or more of the inextensible filament, filament assembly and portion of the openwork fabric (i.e. the extension limiting means) reduces the occurrence of shape variation, as the extension limiting means acts as a governing element that determines the amount of netting applied to each meat portion, which is roughly the same length of net per portion across the entire length of the net coming from the filling tube. The extension limiting means thereby provides more even longitudinal tension throughout the process. Therefore, the extension limiting means provides the advantage of a more consistent shape between meat portions. An alternative explanation of the effect of the extension limiting means is that the openwork fabric shirred onto the delivery tube provides substantially the same radial pressure through the process and as the process proceeds, there is an increase in longitudinal tension, and then tautness comes into the structure through the extension limiting means limiting elasticity (extensibility).

In alternative embodiments, the extension limiting means is applied to conventional openwork fabrics or nets, which imparts the numerous advantages described herein to the conventional openwork fabric. The application of the extension limiting means to conventional openwork fabrics or nets will be briefly described below. Any prior description of the extension limiting means is equally applicable to the extension limiting means when applied to conventional openwork fabrics, as appropriate. Accordingly, in embodiments, the extension limiting means is applied to an openwork fabric comprising longitudinal members and circumferential members, where the circumferential members form a continuous spiral and are normally formed from elastic material and where the longitudinal members are normally formed from conventional chain stitching and are normally substantially inextensible. Application of the extension limiting means provides an openwork fabric that may extend up to a point and then the extension limiting means will limit further extension. In embodiments, either one or both of at least one longitudinal member and at least one circumferential member comprise at least one filament assembly as herein described and as appropriate for the function of the at least one longitudinal member and/or at least one circumferential member.

As defined previously, a filament assembly may be extensible or substantially inextensible. In embodiments, the conventional openwork fabric comprises extensible and substantially inextensible filament assemblies. In embodiments, each extensible filament assembly comprises at least one filament or composite filament. In embodiments, at least one extensible filament assembly comprises at least one extensible filament and at least one substantially inextensible filament. In embodiments, each substantially inextensible filament comprises at least one filament or composite filament.

In embodiments, the conventional openwork fabric has extensible and substantially inextensible filament assemblies in a ratio of between 40:1 and 1:40. In embodiments, the longitudinal members of the conventional openwork fabric comprise extensible and substantially inextensible filament assemblies in a ratio of between 40:1 and 1:40. In embodiments, the extensible and substantially inextensible filament assemblies are in a ratio of 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20 or any ratio between 20:1 and 1:20. In embodiments, longitudinal members comprise extensible and substantially inextensible filament assemblies in any suitable pattern that provides any one of the above ratios (i.e. from 40:1 to 1:40). Accordingly, a ratio of 1:3 of extensible to substantially inextensible filament assemblies could be in a pattern where 1 extensible filament assembly is separated by 3 substantially inextensible filament assemblies, in a pattern where 2 extensible filament assemblies are separated by 6 substantially inextensible filament assemblies, or any other suitable pattern.

The conventional openwork fabric may comprise any suitable number of filament assemblies to provide a desired size or extensibility. In embodiments, the conventional openwork fabric comprises between 1 and 1000 filament assemblies or greater than 1000 filament assemblies. In an embodiment, the conventional openwork fabric comprises 36 filament assemblies and has a ratio of 1:3 extensible to substantially inextensible filament assemblies (i.e. 9 extensible filament assemblies and 27 substantially inextensible filament assemblies). It is within the scope of the disclosure that the number of filament assemblies may be varied to provide different sized nets for different applications. Similarly, the ratio of extensible to substantially inextensible filament assemblies may be varied depending upon the desired extensibility of the net.

In embodiments, the extension limiting means limits longitudinal extension of any one or more of the filament, filament assembly and conventional openwork fabric. For example, the extension limiting means may limit longitudinal extension of a longitudinal member of the conventional openwork fabric.

In embodiments, the extension limiting means is a portion of at least one extensible filament, such as the substantially inextensible thread or yarn such as cotton or any other fibre wrapped around each extensible filament. As tension is applied to the extensible filament, the extensible filament extends until the inextensible yarn becomes taut and prevents further extension.

In embodiments, the extension limiting means consists of at least one substantially inextensible filament that is knitted, woven or similar in a relaxed state and becomes taut when tension is applied and prevents further extension.

In embodiments, the extension limiting means consists of at least one inextensible filament that is knitted, woven or similar, that is adjacent to or near to at least one extensible filament. As tension is applied to the extensible filament, the extensible filament extends until slack in the knitted inextensible filament is taken up and the inextensible filament becomes taut and prevents further extension of the extensible filament. Accordingly, the at least one substantially inextensible filament may be combined with the at least one extensible filament to provide a filament assembly. The filament assembly is extensible and has an extension limiting means.

In embodiments, the extension limiting means is at least one substantially inextensible portion of the openwork fabric. As tension is applied to the openwork fabric, at least one extensible portion of the openwork fabric extends until the inextensible portion becomes taut and prevents further extension of the extensible portion. In embodiments, the openwork fabric may have extensible and inextensible portions, provided by extensible and inextensible filaments, respectively. The extension limiting means thereby prevents any one or more of the extensible filament, filament assembly and extensible portion of the openwork fabric from reaching their respective limits of extension (i.e. the point of failure).

Accordingly, in certain embodiments, the openwork fabric comprises longitudinal members comprising alternating inextensible or substantially inextensible with extensible filaments or filament assemblies, as appropriate, and a circumferential member, where the substantially inextensible filaments or filament assemblies are the extension limiting means.

In alternative embodiments, the extension limiting means is applied to a conventional openwork fabric comprising conjoined members and intermediate members constructed from thread or filament assemblies and that together form a diamond shaped pattern. Each filament assembly is aligned substantially longitudinally along the net as the filament assembly transitions through intermediate members and conjoined members in zigzag pattern. As each filament assembly zigzags longitudinally along the net, the filament assembly zigs on a first diagonal through an intermediate member toward an adjacent filament assembly on a first side and forms a conjoined member with said adjacent filament assembly, before the filament assembly zags on a second diagonal through an intermediate member toward a second adjacent filament assembly on a second side and forms a conjoined member with said second adjacent filament assembly. An alternative description is that the openwork fabric is constructed similarly to the above description for the net forming hexagon shapes, however instead of the conjoined members having a length so as to form longitudinally aligned regions, the conjoined members are shorter so that the filament assembly enters and exits the conjoined member as intermediate members that form substantially a right angle or any other appropriate angle according to the tension applied to the openwork fabric. The sequence of transitions through the intermediate and conjoined members is repeated for each filament assembly along the length of the net.

The extension limiting means may be applied to a diamond patterned conventional openwork fabric according to any prior description of the extension limiting means, as appropriate.

Similarly, the extension limiting means can be applied to any other conventional netting pattern, such as a square shaped pattern.

The variation in the ratio of extensible filament assemblies to substantially inextensible filament assemblies provides an openwork fabric that applies different amounts of pressure or compression to the encased meat product and therefore provides different shaped meat products. Increasing the number of extensible filament assemblies provides increased longitudinal pressure on the meat. The increased longitudinal pressure results in a more rounded meat product. Accordingly, the ratio of extensible filament assemblies to substantially inextensible filament assemblies is altered depending upon the desired shape of the meat product. Increasing the number of extensible filament assemblies also provides increased circumferential pressure or compression on the meat.

The extension limiting means acts to provide a more consistent shape between meat portions for all ratios of extensible filament assemblies to substantially inextensible filament assemblies. For example, increasing the ratio increases the longitudinal pressure and results in a more rounded meat product, and the extension limiting means acts to provide a more consistent rounded meat product.

Embodiments of the present disclosure can be used to provide a netting which is elastically extensible in both the longitudinal and transverse directions to provide an even tension when dispensed from a delivery tube and an improved indentation upon the surface of the meat product. Further, traditional netting normally only applies a square or rectangular pattern to the surface of a meat product whereas embodiments of the present disclosure can be used to provide different shapes, including a hexagon pattern, diamond pattern or variations combining various individual shapes and patterns.

As the fabric is extensible in both longitudinal and transverse directions, the fabric has the characteristic of adapting the shape and size of the holes in the net, for example, a hexagon, to the differing diameter of the meat product. i.e., at the centre of the meat product where the diameter is the largest the hexagons are stretched more and therefore are larger in size. At the two ends of a rugby ball shaped meat product, where the diameter of the meat product is reducing, the imprint on the meat is still strong due to the elastic material, but with less stretch the shapes are smaller. Accordingly, the net provides variable indentations when stretched to different extents. Further, the use of extension limiting means ensures that greater control and consistency of the shape of the meat products can be achieved.

In addition to the larger pattern, when stretched, the net provides greater or deeper indentation. This provides an aesthetically pleasing pattern to the surface of the meat that has not been seen in this technical field before. Existing meat nets are substantially inextensible in the longitudinal direction and accordingly the pattern on the surface of the meat does not substantially vary with the size of the meat retained within the net. These existing meat nets, with elastic characteristics in a lateral (i.e. width) direction, are square or rectangular in shape whereas embodiments of the netting of the present disclosure can be produced in a range of different shapes including a hexagonal, diamond pattern or variations combining various individual shapes and patterns. Again the use of extension limiting means ensures that greater control and consistency of the shape of the meat products can be achieved.

The net or openwork fabric of the present disclosure provides even and heavy pressure to meat products for binding and to help prevent the formation of air pockets which can lead to spoilage or unsightly appearance once sliced. Once contained, wrapped or covered within the netting, the meat products may be smoked, boiled, streamed, roasted, cured or subjected to any suitable process.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

It will be appreciated by those skilled in the art that the present disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

The invention claimed is:

1. An openwork fabric comprising;
a plurality of filament assemblies wherein each filament assembly is formed from one or more filaments and the plurality of filament assemblies are knitted as alternating conjoined and intermediate members, wherein each intermediate member has a single filament assembly and each conjoined member has a pair of filament assemblies that are worked together, and each filament assembly transitions from an intermediate member in a first direction into a conjoined member and then transitions into a subsequent intermediate member in a second direction, such that each filament assembly extends longitudinally as the filament assembly transitions through successive intermediate members and conjoined members; and
an extension limiting means to limit a longitudinal extension of the openwork fabric, wherein the extension limiting means comprises a first set of filament assemblies having a first extensibility, and a second set of filament assemblies having a second extensibility less than the first extensibility.

2. The openwork fabric as claimed in claim 1, wherein the extension limiting means has a plurality of the first set of filament assemblies having a first extensibility, and a plurality of the second set of filament assemblies having a second extensibility less than the first extensibility.

3. The openwork fabric as claimed in claim 1, wherein the first set of filament assemblies are extensible filament assemblies and the second set of filament assemblies are substantially inextensible filament assemblies.

4. The openwork fabric as claimed in claim 3, wherein the ratio of extensible filament assemblies to inextensible filament assemblies is between 40:1 and 1:40.

5. The openwork fabric as claimed in claim 4, wherein the ratio of extensible filament assemblies to inextensible filament assemblies is a repeating pattern with a fixed ratio between 1:1 and 1:4.

6. The openwork fabric as claimed in claim 1, wherein each filament assembly in the first set of filament assemblies is comprised of a composite filament.

7. The openwork fabric as claimed in claim 6, wherein each composite filament comprises an inner layer and an outer layer, the inner layer being extensible and the outer layer has at least one spiral winding of an inextensible thread.

8. The openwork fabric as claimed in claim 7, wherein each filament assembly in the second set of filament assemblies is comprised of a second composite filament, wherein each second composite filament has an inner layer and an outer layer, the inner layer being extensible and the outer layer has two or more threads braided together.

9. The openwork fabric as claimed in claim 7, wherein the inner extensible layer is natural rubber, synthetic rubber or elastane.

10. The openwork fabric as claimed in claim 6, wherein each composite filament comprises an inner layer and an outer layer, the inner layer being extensible and the outer layer has two or more threads braided together.

11. The openwork fabric as claimed in claim 1, wherein at least one filament assembly is extensible and at least one of the one or more filaments is elastic thread, and the longitudinal extension of the at least one extensible filament assembly is limited by the extension limiting means.

12. The openwork fabric as claimed in claim 1, wherein the extension limiting means includes any one or more selected from the group consisting of a portion of at least one extensible filament, at least one substantially inextensible filament, at least one filament assembly and at least one portion of the openwork fabric.

13. The openwork fabric of claim 1, wherein each conjoined member includes a pair of adjacent filament assemblies that transition from adjacent first and second intermediate members by joining to form a first end of a conjoined member and separate at a second end of the conjoined member to form adjacent third and fourth intermediate members.

14. The openwork fabric as claimed in claim 1, wherein each intermediate member includes a chain stitch to form a filament assembly.

15. The openwork fabric as claimed in claim 1, wherein each conjoined member includes a chain stitch of a pair of filament assemblies.

16. The openwork fabric as claimed in claim 1, wherein each conjoined member includes two chain stitches of filament assemblies that are joined together.

17. The openwork fabric as claimed in claim 1, wherein the openwork fabric is tubular.

18. The openwork fabric as claimed in claim 1, wherein the openwork fabric is a tubular net.

19. The openwork fabric as claimed in claim 1 wherein the co-joined members are aligned longitudinally relative to a longitudinal axis of the openwork fabric.

* * * * *